United States Patent [19]
Smith

[11] Patent Number: 5,982,303
[45] Date of Patent: Nov. 9, 1999

[54] METHOD FOR ENTERING ALPHA-NUMERIC DATA

[76] Inventor: Jeffrey Smith, 260 Garth Rd., Scarsdale, N.Y. 10583

[21] Appl. No.: 09/017,939

[22] Filed: Feb. 3, 1998

Related U.S. Application Data

[60] Provisional application No. 60/037,228, Feb. 3, 1997.

[51] Int. Cl.$^6$ .................................................. G08B 11/00
[52] U.S. Cl. ........................ 341/22; 341/20; 329/93.18; 708/145; 364/708.1
[58] Field of Search ................................ 341/20, 22, 28; 379/368, 93.18; 708/142, 145; 345/169; 400/486; 364/708.1

[56] References Cited

U.S. PATENT DOCUMENTS

| | | |
|---|---|---|
| 3,381,276 | 4/1968 | James . |
| 3,675,513 | 7/1972 | Flanagan et al. ............... 374/93.18 |
| 3,833,765 | 9/1974 | Hilborn et al. ................... 178/79 |
| 3,967,273 | 6/1976 | Knowlton ......................... 341/22 |
| 4,360,892 | 11/1982 | Endfield ........................... 341/22 |
| 4,443,789 | 4/1984 | Endfield et al. ................. 341/22 |
| 4,817,129 | 3/1989 | Riskin .............................. 379/88.24 |
| 5,007,008 | 4/1991 | Beers ............................... 708/145 |
| 5,281,966 | 1/1994 | Walsh ............................... 341/22 |
| 5,289,394 | 2/1994 | Lapeyre ........................... 708/142 |
| 5,388,061 | 2/1995 | Hankes ............................ 364/708.1 |
| 5,432,510 | 7/1995 | Matthews ........................ 341/20 |
| 5,479,163 | 12/1995 | Samulewicz .................... 341/22 |
| 5,486,823 | 1/1996 | Tsai ................................. 341/22 |
| 5,559,512 | 9/1996 | Jasinski et al. ................. 341/22 |

OTHER PUBLICATIONS

Pulver, "Unwired," *Internet World*. Feb. 1997, pp. 100–102; and.

Manes, "A Lilliputian Pocket Secretary," *The New York Times*. Tuesday, Sep. 30, 1997, p. 6.

*Primary Examiner*—Michael Horabik
*Assistant Examiner*—Albert K. Wong
*Attorney, Agent, or Firm*—Bryan Cave LLP

[57] ABSTRACT

A method is provided for transforming ordered pairs of keystrokes entered on a keypad with eight or more keys into a full complement of alpha-numeric characters, as might be enterable from a computer keyboard. The method can be utilized with any device that permits an operator to select one of eight keys or other means of generating a distinct electrical or other signal. The keys or positions are arranged radially around a center point in locations corresponding to keys 1–4 and 6–9 of the telephone keypad. Examples of input devices include a numeric keypad, a telephone keypad, and a "joystick." The method employs an alphabet in which each character is represented by a two-stroke pictographic figure. The first stroke proceeds from the position of the first key to be pressed, thence to the center of the keypad or device. The second stroke proceeds from said center to a the position of the second key to be pressed. For the majority of letters, the figure thus formed bears a pictographic resemblance to the printed letter. The operator presses keys corresponding to the beginning and ending points of the pictograph of the desired character or key equivalent.

35 Claims, 7 Drawing Sheets

EIGHT KEYS WITH COMPASS POINTS AND TELEPHONE KEYPAD NUMBERING.

EIGHT KEYS WITH LETTER "A." FORMED ACCORDING TO NOVEL ALPHABET.

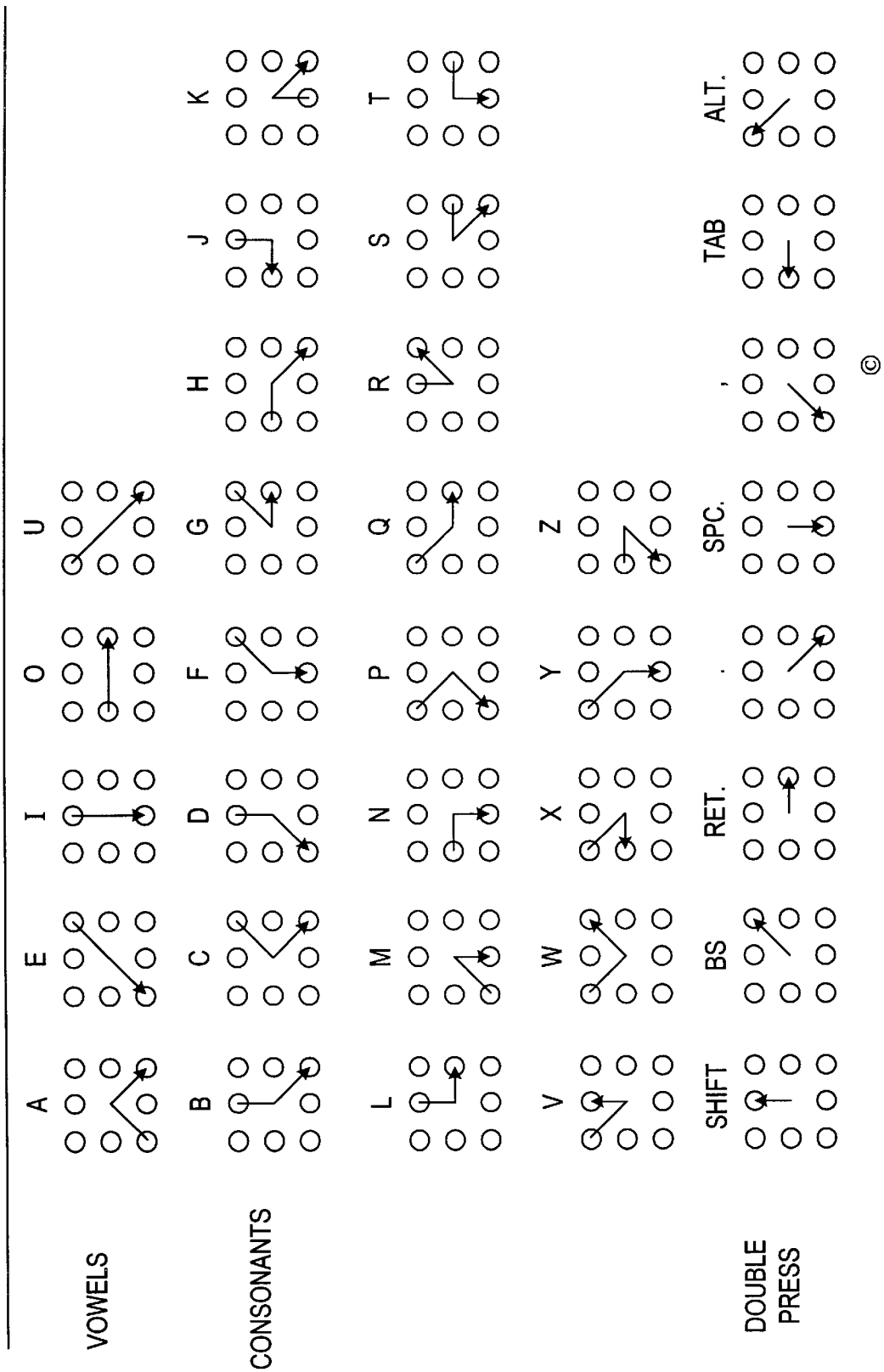
FIG. 3  BASIC ALPHABET WITH PICTOGRAPHS REPRESENTING KEY PAIRS.

*FIG. 4* ADVANCED CHARACTERS: PICTOGRAPHS REPRESENTING KEY PAIRS.

- SECOND CHARACTER ABOVE IS FOR SHIFT, I.E. SHIFT + 9 TO MAKE [.
- DOUBLE ALT. + WORD SUCH AS "FILE" OR "SET TIME" FOR SYSTEM FUNCTIONS.
- ALT + NUMBER KEYS FOR FUNCTION KEYS. FOR F-10 TO F-16, USE CTRL. + 0-6

FIG. 5A

TRANSLATION TABLE FROM DIGIT PAIRS TO CHARACTERS / FUNCTIONS

LOWER CASE MODE

| FIRST KEY | SECOND KEY | | | | | | | |
|---|---|---|---|---|---|---|---|---|
| | 1 | 2 | 3 | 4 | 6 | 7 | 8 | 9 |
| 1 | ALT | V | W | x | q | p | y | u |
| 2 | CTRL. | SHIFT | r | j | ! | d | i | b |
| 3 | '=' | WILD | BS | CURSR | g | e | f | c |
| 4 | > | + | - | TAB | o | z | n | h |
| 6 | " | 4 | < | 0 | RET. | ' | t | s |
| 7 | ) | OPT. | / | 3 | ; | , | m | a |
| 8 | 9 | 1 | ESC. | 7 | 5 | * | SPC. | k |
| 9 | \ | 6 | ( | : | 2 | 8 | ENT. | . |

FIG. 5B

WITH SHIFT KEY MODIFIER

| FIRST KEY | SECOND KEY | | | | | | | |
|---|---|---|---|---|---|---|---|---|
| | 1 | 2 | 3 | 4 | 6 | 7 | 8 | 9 |
| 1 | | V | W | X | Q | P | Y | U |
| 2 | | | R | J | L | D | I | B |
| 3 | ~ | | | S | G | E | F | C |
| 4 | ≥ | | _ | | O | Z | N | H |
| 6 | | $ | ≤ | ] | | | T | S |
| 7 | } | | ? | # | | | M | A |
| 8 | [ | ! | | & | % | | | K |
| 9 | | | ^ | { | @ | * | | |

UNIVERSAL HANDHELD DATA TOOL

METHOD FOR ENTERING ALPHA-NUMERIC DATA

This application claims priority of Provisional application Ser. No. 60/037,228 filed Feb. 3, 1997, the entire disclosure of which is hereby incorporated by reference.

FIELD OF INVENTION

This invention relates to input devices and methods for alpha-numeric data entry using a reduced number of keys.

BACKGROUND OF THE INVENTION

The qwerty keyboard has become a worldwide standard for alpha-numeric data entry, but as electronic functionality is increasingly miniaturized, the size of a usable touch-typing keyboard becomes much larger than the package needed for many modern devices. Thus, there is an increasing need for a widely acceptable method for entering alpha-numeric data that can be easily incorporated into small handheld devices.

One proposed solution to this problem has been to miniaturize the keys of the query keyboard and other controls. At same time, since the development of the push-button telephone, attempts have been made to find a widely acceptable method for alpha-numeric data entry using the push-button telephone as a remote data terminal. U.S. Pat. No. 3,675,513 purports to describe a method of alpha-numeric data entry from the telephone keypad. In accordance with the '513 patent, a plurality of letters are printed on the standard telephone keys and a letter is entered by pressing its corresponding key a predetermined number of times. For example., the "2" key has "ABC" printed on it, and, to form the letter "B", the "2" key is pressed twice to indicate that the desired letter is "3", the second of the three letters printed on the key. Special combinations have been developed to represent "Q" and "Z," which are not printed on the telephone keypad.

U.S. Pat. No. 5,559,512 purports to use "hard keys" which represent a plurality of characters in combination with "soft keys" displayed on a screen which are used to select the correct one of several possible hard key characters.

Another proposed system is to use chorded keypads in which combinations of keys are pressed simultaneously. One example of such a system is the Stenotype machine used in court reporting. Variations on this system have also been proposed. For example, U.S. Pat. Nos. 4,360,892 and 4,443,789 purport to provide a 5-key chorded system designated "Microwriting", which utilizes a special apparatus having four finger keys and at least one thumb key, and in which the pre-selected key combinations were chosen to suggest a pictographic relationship to the English alphabet.

Finally, the availability of powerful computers in small packages has given rise to systems that bypass the use of keys entirely, including, for example, voice recognition software which is responsive to spoken words, and handwriting recognition software which is responsive to a special stylus and touch screen.

SUMMARY OF THE INVENTION

Each of the above-referenced systems, however, suffer from deficiencies which limit their usefulness. A miniaturized query keyboard, for example, has a number of disadvantages. First, the small size of each key makes touch-typing difficult, if not impossible. Moreover, locating the correct miniaturized key is slow and inconvenient. In addition, because of the small size of the keys, the printed key labels must be abbreviated, resulting in confusion and the need to consult elaborate printed manuals to operate the device. Finally, as functionality increases, the number of keys required to control all functions with a querty keyboard becomes excessive. This often requires multiple functions for each key, thereby compounding the problem of labeling keys with alternate functions as well as primary functions.

Push-button telephone arrangements, such as the system of the '513 patent, are slow and cumbersome to use because of the need to search out keys and combinations for each letter. As JeffPulver noted in, "Unwired", Internet World Magazine, February, 1997, at page 100:

While the potential market for this product is pretty big, from a practical vantage point the user interface [a phone keypad] may need to be reengineered before it is accepted by the mass market. For example, with the phone I tested in order to write out a phrase like "ABC," I had to hit the keypad with the number-two button six times: one time for the "a," two times for the "b," and three times for the "c." As a result, while my regular e-mail messages have a tendency to be a bit long, messages originating from my PocketNewt phone have been short.

The hard key/soft key arrangement of the '512 patent uses less keystrokes than the phone keypad system of the '272 patent, but requires a specialized apparatus and a slow visual search for the correct key to actuate. Furthermore, this and other systems using standard telephone keypads have not permitted entry of the full range of punctuation, symbols and functions available on the standard computer keyboard.

Chorded keypads arrangements purport to allow rapid data entry by a highly trained operator, but use unfamiliar apparatus and require training before even casual use. These methods have failed to achieve widespread acceptance because of the need for extensive training before any use is possible. The "Microwriting" systems of the '789 and '892 patents similarly utilize a special apparatus (having four finger keys and at least one thumb key). In addition, while the pictographic representation of the alphabet was apparently intended to simplify and aid learning of the keystroke alphabet, the pictographs are neither obvious nor intuitive, making immediate use of the device without training impractical. Moreover, it requires up to five keystrokes for a single character. For these reasons, these systems have also not found widespread use. Handwriting recognition systems, in addition to requiring powerful and expensive computing power, are inconvenient because they require two hands for operation, one to hold the pen, which must first be removed from a storage place, and the other to hold the device. They are also unsuitable for "touch typing", i.e. typing without looking. Finally, while voice recognition systems do not require visual monitoring, they require speaking out loud, which is distracting and unsuitable for situations such as business meetings. Moreover, voice or handwriting recognition systems are less reliable than keystroke systems because they require the computer to interpret voice and handwriting patterns which may vary significantly from one user to the next.

At least three factors appear to affect the market acceptability of such a device. First, a data entry method should allow a new operator to employ the method immediately, as with the querty keyboard and the telephone keypad. Second, it is difficult to obtain widespread acceptance of a system which employs a specialized apparatus that is not familiar to the public. Third, once a new operator has become familiar with the data entry method, the method should permit relatively rapid data entry without laborious searching for each key or key combination. The above-referenced systems have failed to gain acceptance because they fail to address one or more of these factors.

In accordance with a first embodiment of the present invention, a method for entering alpha-numeric data is provided which permits entry of a complete set of alpha-numeric characters with a data input device having eight keys or other actuation points arranged in an array. Each alpha-numeric character is input by entering sequential keystrokes which define a corresponding pictograph. The pictographs, in turn, have endpoints defined by the sequential keystrokes, and a midpoint defined by a center point of the array. A ninth key may also be added to provide additional functionality. In accordance with a further aspect of the invention, only two keystrokes are required to define each pictograph.

The method according to the present invention provides a number of advantages. It allows entry of a complete set of alpha-numeric characters and functions using no more than 9 keys, and which can be implemented with a conventional touch-tone telephone, or with a wide variety of other input devices capable of registering eight distinct inputs at actuation points, such as a joystick or touch screen. Since the method according to the invention requires no more than nine keys, it can be implemented in a small enough space to be accommodated in a range of miniature handheld electronic devices, while still allowing "touch-type" data entry techniques to be used. In addition, it can be implemented using only one hand for data entry.

Moreover, the two-stroke pictograph feature of the present invention provides the surprising advantage of enabling an untrained operator to more quickly learn the pictographs which correspond to each character or function. In this regard, it has been found that when the pictograph is defined by only two keystrokes, there is generally only one character that resembles each pictograph, thereby making it easier for an untrained operator to learn the method.

A further advantage of the present invention is that it provides a method and apparatus for alpha-numeric data entry which is simple to manufacture or implement using common and inexpensive technologies, which, being character based, makes efficient use of bandwidth, and which can be applied to a very wide variety of existing and yet to be invented devices and systems. Still further objects and advantages will become apparent from a consideration of the ensuing description and drawings.

BRIEF DESCRIPTION OF THE DRAWINGS

FIG. 3 shows a basic alphabet and functions, along with the corresponding pictographs and key pairs in accordance with an embodiment of the invention.

FIG. 4 shows a set of advanced characters and functions, along with the corresponding pictographs and key pairs in accordance with an embodiment of the invention.

FIG. 5a shows a translation table for the key pairs and "unshifted" characters/functions in accordance with an embodiment of the invention.

FIG. 5a shows a translation table for the key pairs and "shifted" characters/functions in accordance with an embodiment of the invention.

DETAILED DESCRIPTION OF THE PREFERRED EMBODIMENTS

Figure 1:
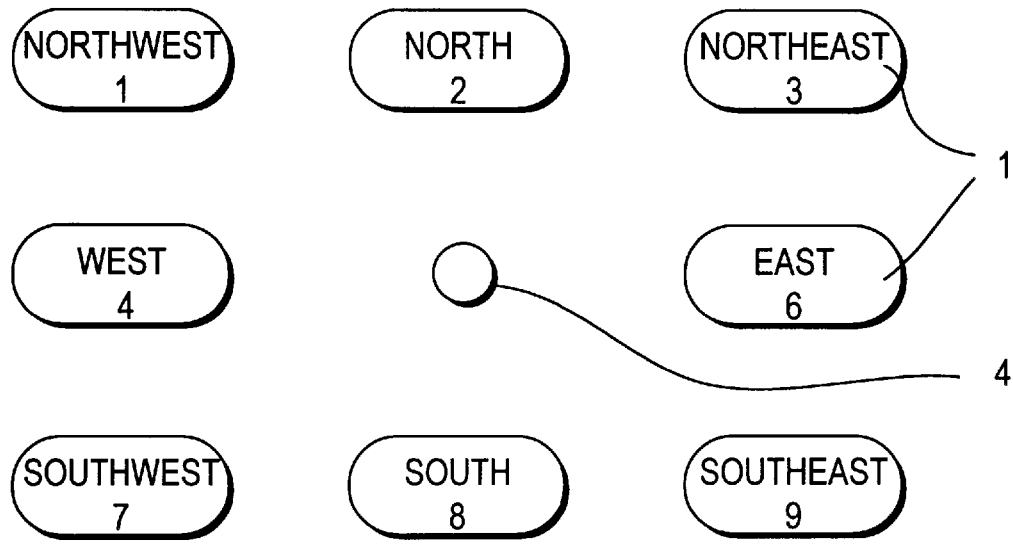
FIG. 1 shows a keypad having eight keys.

FIG. 1 shows an eight-key keypad with keys 1, and a center point 4, in accordance with an embodiment of the invention. The keys 1 are arranged radially about the center point 4 at approximately 45 degree intervals. The keypad is shown without reference to a corresponding apparatus because, in accordance with the method according to the invention, a variety of apparatus can be used to provide the eight key keypad including, for example, a touch tone telephone, a hand-held remote control for a television, VCR, stereo, or other appliance or remote-controlled device, or a touch screen.

Figure 2:
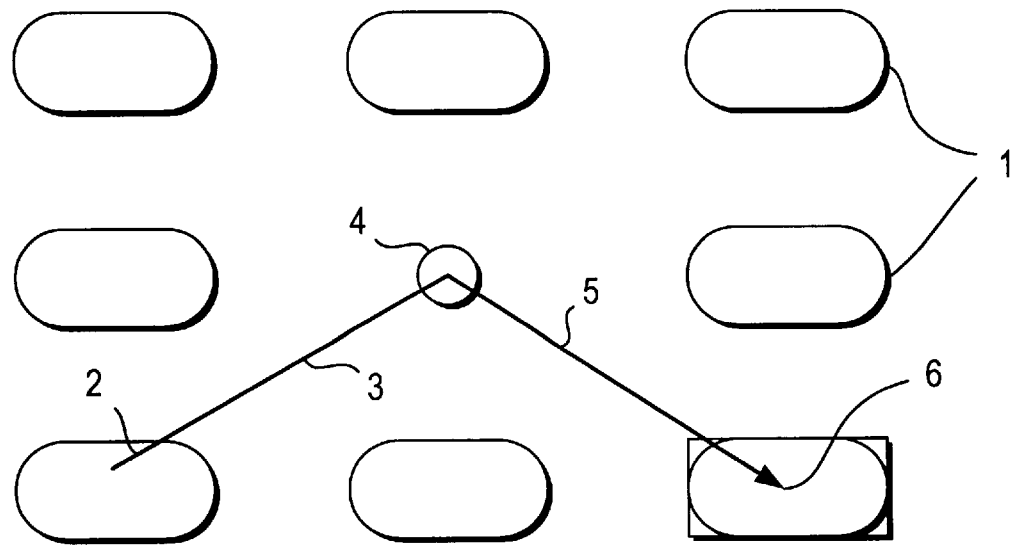
FIG. 2 shows the keypad of FIG. 1, with a pictograph for the letter "A" indicated in accordance with an embodiment of the invention.

FIG. 2 shows the keypad of FIG. 1, with the letter "A" shown in pictographic form overlying the keypad to illustrate the two key sequence for entering the letter "A" on the keypad. The first key to be pressed is indicated as the starting point 2 of the pictograph, and the second key to be pressed is indicated as the end point 6 of the pictograph. The pictograph is defined by two strokes. A first stroke 3 begins at starting point 2 of the two key sequence, and ends at center point 4 of the keypad. A second stroke 5 begins at center point 4 and ends at ending point 6. Ending point 6 is indicated by an arrowhead. As shown in FIG. 2, the resultant pictograph resembles the letter "A", and requires only two keystrokes.

FIG. 3 shows a preferred alphabet and basic function sequences by key sequence and pictograph in accordance with an embodiment of the present invention. The pictographs follow the same format as in FIG. 2, with the first key or starting point for each character being represented by the tail of the arrowhead, and the second key or ending point for each character being represented by the head of the arrow. It should be noted that all the characters are formed from top to bottom of the figure unless both the starting point and ending point are in the same row, in which case the direction is from left to right. As explained below, the reverse is true for characters in FIG. 4. In the case of characters identified by a single key, the tail of the arrow resides in the center point, with the head of the arrow pointing to the key.

FIG. 4 shows a preferred configuration for numerals, punctuation, function keys, etc., in accordance with an embodiment of the invention. The legend above each pictographic figure indicates the character without "shift" being invoked on the left, and the character after "shift" is invoked (by pressing key 8 (bottom row, center) twice) on the right. It should be noted that the characters in this figure take the opposite direction as those in FIG. 3, i.e., from bottom to top or right to left.

FIGS. 5a and 5b shows the corresponding first and second keystrokes for characters and functions keys numbered as on the telephone keypad. There is no entry for key "5" on the telephone keypad because the eight key array illustrated in this Figure does not utilize this key. As illustrated in FIG. 5b, shifted characters such as capitals are formed by first entering the two key sequence for "shift" (The "8" key pressed twice), and then the sequence for the corresponding lower-case character or function.

In accordance with the present invention, it has been discovered that, by providing a pictograph based upon only two strokes of 8 keys, it becomes easier to learn which pictograph corresponds to which character. Put simply, it has been found that fewer choices can make learning easier. It has been discovered that, with only 8 keys, there is generally only one two-stroke pictograph that bears a resemblance to any given printed letter. Consequently, what appears to be a limitation, i.e., a limited number of keys and keystrokes, actually becomes an asset in memorizing the alphabet. For example, when evaluated in the context of the explanation set forth below, there is only one pictograph that bears any resemblance to the printed "A." (FIG. 2).

With a keypad of 8 keys, each keystroke represents 3 bits of data. Two sequential keystrokes add up to 6 bits, which results in 64 possible combinations. By adding the use of a shift key, the number of available characters and functions is increased to 128. The use of other modifier keys further increases the theoretical number of possible characters or functions. However, in accordance with the preferred embodiment of the invention, special key combinations are minimized, and plain English commands are used which are easier to remember and can be composed with relative ease and rapidity.

Alpha-numeric data is entered by an operator pressing two keys sequentially for each character or function. The first key pressed is the key corresponding to starting point 2 of a character. The second key pressed is the key corresponding to ending point 6 of said character. Control characters and others where starting point 2 and ending point 6 are the same, are formed by a double press on the same key.

The pictograph representing each key pair consists of a line from starting point 2, the location of the first key, drawn to center 4 of the figure, and then to the location of ending point 6 at the location of the second key of the key pair. In accordance with the preferred embodiment of FIGS. 3–5, the vowels other than the letter "A" are formed by key pairs where the keys are situated opposite each other with respect to the center of the keypad. The pictographs for the vowels "A" and "I" closely resemble their corresponding characters, while the pictographs for "E", "O", and "U" can be easily remembered as a clockwise rotation of the pictograph for the letter "I." As mentioned above, the order in which the two keys are pressed is determined by simple rules. For letters of the alphabet, when the two keys are situated in different rows, that is, one above the other, the uppermost key is pressed first. When both keys are in the same row, then the leftmost is pressed first. For numerals and other advanced characters and functions these rules are reversed. In addition, the most important functions and the period and comma are formed by double presses of the same key as shown in FIG. 3.

When first utilizing the method of the invention, an operator is supplied with a pictographic chart of characters as in FIGS. 3 and 4. The pictographic chart indicates the starting and ending key for each character to be entered, and also shows the pictographic representation of the character. The operator finds the desired character on the chart and enters the key sequence. As experience is gained, the operator may utilize the chart to further memorize keypairs. Memorization is facilitated by the resemblance of many of the pictographs to the printed letter. Memorization may be further aided by the operator practicing the written representation of pictographs on a blank chart of keypad figures.

In accordance with one embodiment of the invention, the data entry device used is a conventional touch-tone telephone keypad, using the number keys 1–4 and 6–9, which together form the eight key array of FIG. 1. Electrical signals derived from the operator's key presses are transmitted using conventional telecommunications techniques to a remote computer where the translation of key pairs into equivalent alpha-numeric characters and functions is accomplished as described below.

The present invention is intended to be compatible with existing software and systems. For example, the method of the invention can be invoked or terminated by a special key sequence such as two rapid presses on the "*" key. In this manner, the implementation of the present invention in telephone systems will not interfere with or alter pre-existing telecommunication systems, but, instead, is superimposed over these systems.

Figure 7:
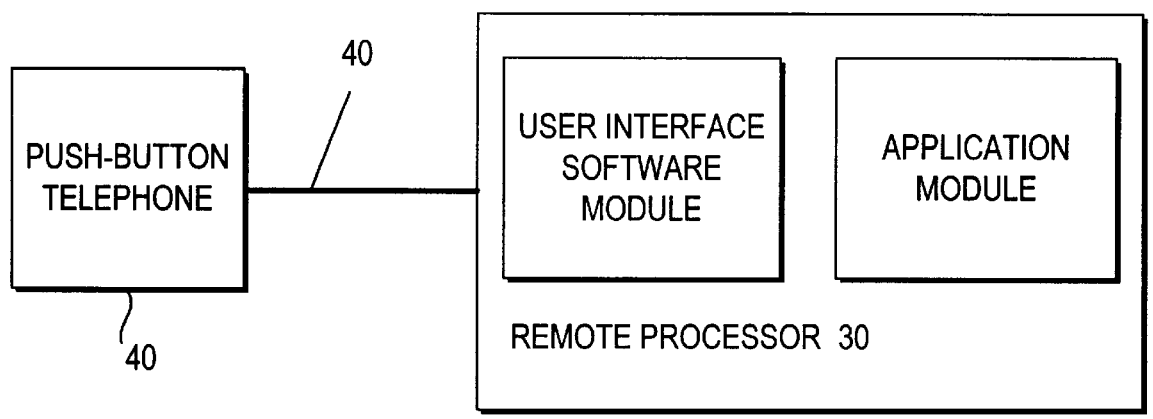
FIG. 7 shows a keypad entry system in accordance with an embodiment of the invention.

FIG. 7 shows an illustrative implementation of the present invention using a conventional touch tone telephone. A touch tone telephone 20 is coupled to a remote processor 30 via conventional telecommunication lines 40. The remote processor 30 may, for example, be a conventional desktop or laptop computer. The remote processor 30 includes a user interface software module which converts keystrokes entered on the telephone 20 into alphanumeric characters (e.g., an ASCII character set), and an application module which processes the alphanumeric characters in a conventional manner to perform a desired function. An example of such an embodiment would be the implementation of a telephone directory information service without the need for a human operator. The information seeker would enter the name of the desired party using the method of the invention, and at a remote location, the user interface software module would translate the key pairs into characters and the application module would accept the characters as input, search a database and respond with a synthesized voice giving the correct telephone number.

Figure 8:
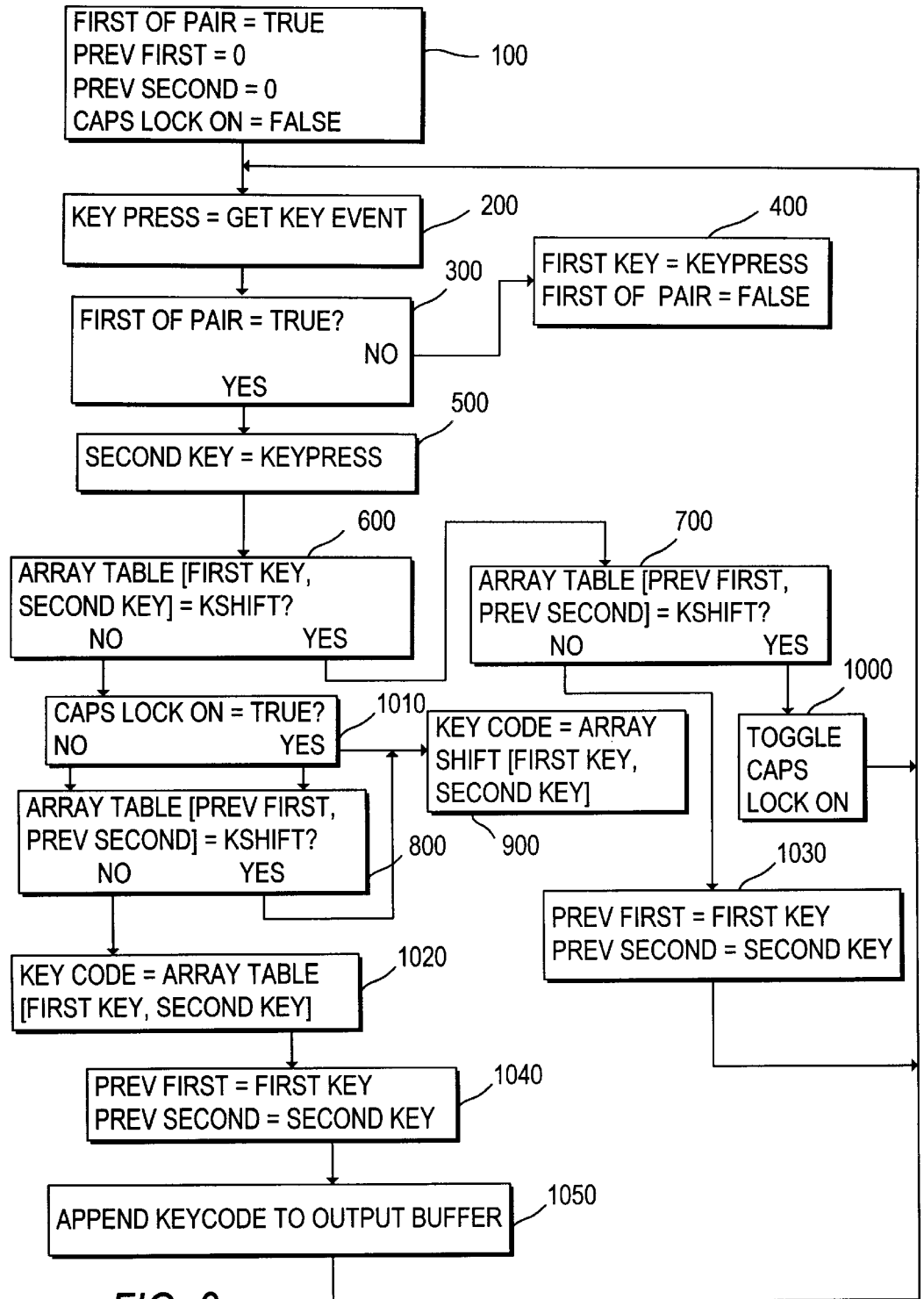
FIG. 8 shows a flow chart for illustrative software for translation of keystrokes in accordance with an embodiment of the invention.

FIG. 8 shows an illustrative flowchart for the user interface software module of FIG. 7, which is operable to translate the keystrokes of FIGS. 3–5 to their corresponding characters. Referring to FIG. 8, at step 100, the variable FirstOfPair is initialized to True, CapsLockOn is initialized to FALSE, PrevFirst is initialized to 0, and PrevSecond is initialized to 0. At step 200, a keystroke is read (GetKeyEvent) and stored in the variable KeyPress. If the keystroke read is the first keystroke of a pair, then FirstOfPair at step 300 will be true, and the value of the variable KeyPress will be stored as FirstKey. FirstOfPair is then set to FALSE (step 400) and the program returns to step 200 to receive the next keystroke. Upon receiving the next keystroke at step 200, the system will proceed through step 300 to step 500 (because FirtOfPair is FALSE), and the value of the variable KeyPress will be stored as SecondKey. At step 600, the contents of an entry in the array "Table" at position "FirstKey,SecondKey" is compared to the "Shift" character. In accordance with a preferred embodiment of the invention the array "Table" is defined as shown in FIG. 5a. If the value in arrayTable(FirstKey, SecondKey) is not "Shift", then the program proceeds to step 800, and if the variable CapsLockOn is not True (step 1000), and the value in arrayTable(PrevFirst, PrevSecond) is not "Shift" (step 800), then the value in arrayTable(FirstKey, SecondKey) is stored as the variable KeyCode at step 1020. For example, if FirstKey=7, and SecondKey=9, the program would proceed through steps 600, 1000, 800, 1020 and store "a" as KeyCode. At step 1040, the current key pair (FirstKey, SecondKey) is stored as the previous key pair (PrevFirst, PrevSecond), and at step 1050, the contents of the variable KeyCode are appended to the Output Buffer for further processing by the Application Module.

The processing of the "shifted" characters of FIG. 5b proceeds in the following manner. As an example, let us assume that the following two keystrokes are entered on the keypad: 2,2 (corresponding to "Shift") and 2, 3 (corresponding to "r"). At step 600, the contents of arrayTable(FirstKey=2, SecondKey=2) will be equal to "Shift" (FirstKey=2, SecondKey=2), and the program will proceed to step 700 to determine if the previous keystroke pair arrayTable(PrevFirst, PrevSecond) was also equal to "Shift." If it was, then the variable CapsLockOn is toggled (i.e., from TRUE→FALSE, or from FALSE→TRUE) at step 1000, and the program returns to step 200 to retrieve the next keystroke pair. In this manner, entry of "[SHIFT][SHIFT]" on the keypad will duplicate the functionality of the "Caps Lock" function of a conventional query keyboard. In this case, however, we will assume that, at step 700, the previous keystroke pair arrayTable(PrevFirst, PrevSecond) was not equal to "Shift." Therefore, the current key pair (which is 2, 2 in our example) is saved as the previous key pair (step 1030), and the program returns to step 200 to retrieve the next keystroke. The next keystroke pair (FirstKey=2, SecondKey=3) is retrieved at steps 200 through 500, and since CapsLockOn is False and the contents of arrayTable (FirstKey=2, SecondKey=3) is not equal to "Shift" (FirstKey=2, SecondKey=2), the program will proceed (at step 800) to determine if arrayTable(PrevFirst=2, PrevSecond=2) is equal to "Shift," which, in our example, it is. The program will therefore proceed to step 900, to retrieve the contents of an entry in the array "Shift" at position "FirstKey,SecondKey.". In accordance with a preferred embodiment of the invention, the array "Shift" is defined as shown in FIG. 5b, and the contents of arrayShift (FirstKey=2, SecondKey=3), i.e. "R" is stored as the variable KeyCode. From step 900, the program proceeds to step 1040, the current key pair (FirstKey, SecondKey) is stored as the previous key pair (PrevFirst, PrevSecond) and, at step 1050, the contents of the variable KeyCode are appended to the Text Buffer for further processing by the Application Module. Finally, if, at step 1010, it is determined that CapsLockOn is True, the program will proceed to step 900, and then perform steps 900, 1040, and 1050 in the same manner.

In accordance with a further embodiment of the invention, a keypad with 9 keys (or any other device such as a joystick with an additional button to provide a 9th distinct electrical signal) may be provided. Keys 1 through 8 function in the manner described above. The 9th key (the "five" on the telephone keypad), however, is used to toggle a cursor control mode. Once the cursor control mode is entered, the remaining 8 keys function as cursor movement keys. A double press of said 9th key invokes the cursor control function. A second double press of the center key terminates cursor control mode, and returns to normal functioning. The cursor movement feature is particularly useful in conjunction with the universal hand tool described below with regard to FIG. 6.

Additional functions which can be invoked by a single press of the ninth (or center) key would be (a) to reset the translation software to be ready to receive the first key of a new pair; and (b) to generate a "space" when pressed following a completed character. This provides a more rapid way to enter spaces, (the most frequently used character) and has the additional benefit of resetting the translating software to prevent the operator from mistaking the second key of the previous pair for the first key of the current pair. Moreover, if, prior to entering the second key of a pair, the operator realizes that the first key was pressed erroneously, he or she can press the ninth (or center) key, thereby clearing the erroneous single keystroke, and allowing data entry to resume.

Numerous devices are commercially available that are capable of receiving operator input resulting in one of eight distinct electrical, mechanical, or light, or any other type of signal inputs. The computer joystick, for example, typically comprises four switches corresponding to North, South, West and East. Movement towards the intermediary directions causes two of the switches to be actuated simultaneously, thereby providing four additional distinct signal corresponding to Northwest, Northeast, Southwest and Southeast. Thus, the joystick may be substituted for the keypad described above by using the same pictographs, and substituting movement of the joystick for the sequential keystrokes. For example, to enter "A" with a joystick, the lever would first be moved towards the Southwest, back to the center and towards the Southeast.

Another suitable control device comprises a flat disk whose outer rim is pressed at the top, bottom, left or right. Again, the use of intermediary positions between the cardinal ones gives a total of eight distinct positions arranged radially around the center. Therefore, present invention can be implemented on this device as well. In this regard, the keypads of many current handheld Global Positioning System instruments include such a disk utilized for navigation among software functions. In these devices, alpha-numeric data is conventionally implemented by scrolling through a list of letters to select the correct one. Instead of this cumbersome system, the present invention could be implemented using the disk to provide alpha-numeric data entry. Other apparatus can be developed or adapted to further enhance the speed, ease miniaturization or availability of alpha-numeric data entry using the present invention.

The pictographs of the present invention may also be used in written form, and would be particularly well suited to machine character recognition in a pen based system. In such a system, the two strokes of the pictograph, or a single stroke joining two positions on an eight pointed figure would be easily distinguishable by character recognition software means.

The method in accordance with the present invention is not limited to the English language and may be readily used with foreign languages, including languages without Roman letters. Those languages that utilize accents and other special marks can utilize the method according to the invention by creating alternative key combinations, especially utilizing the [Alt.] key in combination with other keys to form special characters and accented letters. The same principles may be utilized to develop keystroke combinations to represent other non-Roman based alphabets.

Figure 6:
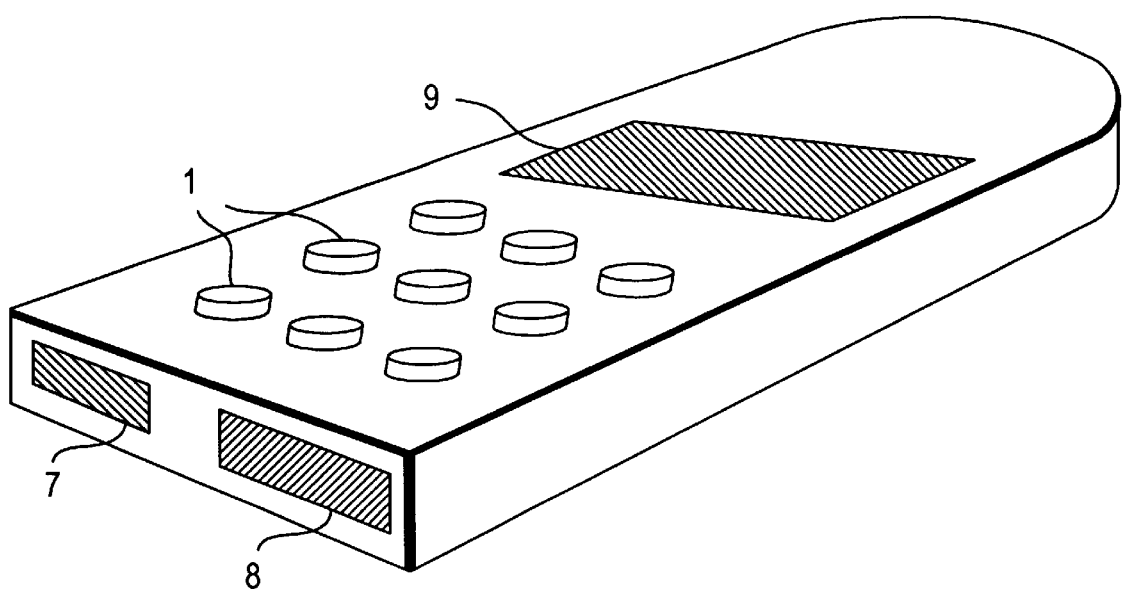
FIG. 6 shows an illustrative Universal Handheld Data Tool in accordance with an embodiment of the invention.

FIG. 6 shows an illustrative handheld data tool 10 which may be used as a data entry device in accordance with an embodiment of the present invention. Data is entered using keys 1 according to the method of the invention. Data maintained internally is displayed on display screen 9. Data may be transmitted and received through infrared I/O port 7 in any conventional manner. Auditory signals are emitted from the speaker 8. The tool 10 is battery operated, and utilizes commonly available technology, such as a microprocessor, memory and associated logic for the storage and exchange of alpha-numeric data. Various functions and commands are entered by the operator using plain English such that memorization of obscure codes is not required. Different functional modes are invoked by entering two successive "Alt." characters (Four presses on the "1" key). This is followed by entry of a keyword such as "control" or "memo" to invoke the remote control or note taking functions respectively.

As described in more detail below, the tool 10 can be used to provide a number of functions including, but not limited to, a controller for a television based Internet browser, a computerized address book, a telephone dialer, an appointment book, a calculator, or a remote control for household appliances. It should be noted, however, that the present invention is not concerned with the specific software and/or hardware used to perform the functionality of these devices (e.g., the software which performs the Internet search function, or which performs the calculations for the calculator function). Rather, in accordance with the present invention, conventional software and/or hardware techniques known to those of skill in the art are used to implement these functions, but the user interface for these applications is provided in accordance with the alphanumeric data entry system of the present invention.

In accordance with one aspect of this embodiment, the tool 10 is programmed to emulate the remote controls of household devices. A set of pre-defined plain English commands are used to control the household devices. For example, to instruct a VCR to record a program, an operator would enter "[ALT]VCR", then "[ALT]channel" followed by the channel number, "[ALT]start at" followed by the start time, and "[ALT] start on" followed by the start date, and "[ALT]stop at" followed by the stop time. The tool 10 would then transmit the appropriate infrared signals to the VCR via I/O port 7. It should be noted that "universal" remote controls are well known which are capable of controlling televisions, VCRs, and stereos, and which, in response to pressing particular buttons on the remote control, can selectively produce the appropriate infrared signal for any particular television, VCR, or stereo. Therefore, the particular software and/or hardware for producing these signals is not the subject of this application and will not be discussed herein. Rather, in accordance with the present invention, the user interface for the universal remote control has been improved by utilizing the alphanumeric entry system described herein.

In accordance with another aspect of this embodiment, the tool 10 is used to control a television based Internet browser, with the tool 10 serving the function of a standard keyboard. In this regard, the center or "5" key could be used to implement cursor or mouse control in the manner described above. The browser software can be enabled to receive control keywords from the device, such as "Back" to go to the previous screen or "Search" to invoke a search. For example, entering [ALT] [ALT] SEARCH LIBRARY into the tool 10, (with [ALT] representing the keystroke pair 1,1) and transmitting this data to the television based Internet browser, would cause the browser to implement a search for the term LIBRARY. The browser software itself would be entirely conventional, but would be programmed to recognize the control keywords. Naturally, for television browser control, the display screen 9 of the tool 10 can be omitted.

The tool 10 can also be used to provide a computerized notepad which is invoked, for example, by entering [ALT] [ALT] MEMO. Data which is then entered into the tool 10 would appear on the display screen 9 and also be stored in the tool 10. For example, by providing 512 kilobytes of memory in the tool 10 (a modest amount of memory by current standards), approximately 80,000 words of text could be stored. The text can then be transferred from infrared I/O port 7 to an infrared I/O port of a desktop or laptop computer for further processing. The transfer could be invoked, for example, by a single [Alt] character followed by "send."

An address book function could be implemented in the tool 10 in a similar manner. A "find" function could, for example, be invoked by [Alt] followed by "f" followed by the search string to be located. The results of the search would be displayed on display screen 9. Where more than one entry is found, the [tab] character would move to the next entry. To facilitate the process of searching data in memory, a special key pair (3,2 in FIG. 4) is designated as a "wild card" character. In all other respects, the address book function would operate in the same manner as computerized address books which accept input from a querty keyboard. In this regard, the wild card character is processed in a conventional manner, i.e., T[WILD CARD][WILD CARD]L, would return addresses for TOOL AND TALL, but not POOL. Using the infrared port 7, data could be imported from or exported to a computer to maintain identical listings in the computer and the tool 10. The tool 10 could also be programmed to provide a telephone dialing function such that, when a given entry is displayed on the display screen, entering "[Alt] d" will cause the device to emit DTMF tones through speaker 8. Entry of the "n" character (for "next") could allow moving to the subsequent number where one individual has several telephone numbers.

The tool 10 could also be programmed to provide an alarm and appointment book by utilizing the speaker 8 to alert the user of an appointment. As in the case of the Internet browser, address book, and memo pad, conventional software is used to implement the appointment book and alarm. In accordance with the alarm and appointment book in accordance with the present invention, however, the alpha-numeric keypad entry system of the invention replaces the user interface of a conventional handheld personal information managers.

The tool 10 of FIG. 6 can also be used to implement a calculator function. In accordance with a preferred embodiment of the invention, the calculator function more closely resembles written math than traditional calculators. Expressions are written out as they would be on paper, rather than invoking special buttons for special math operations. The calculator function can be invoked by double "[Alt]" followed by "calc." Expressions are then entered in alphanumeric form. When the equal key combination is pressed, the device will evaluate the expression, and display the result. Complex expressions may be entered and evaluated in the same way that spreadsheet software accepts expressions as formulas. For example, entry of "Sin(133)*52+ (27*0.0087)=" would cause the tool 10 to evaluate this function and display the result. The tool 10 could also be programmed to evaluate common formulas such as mortgage payments, where the entry of "pmnt(12*30, 7.5, 100000)" would cause the device to calculate the monthly payment on a 30 year mortgage at 7.5% interest for a loan of $100,000. Once again, it should be noted that conventional software is utilized to perform the calculations, but the alpha-numeric keypad entry system of the invention replaces the user interface of a conventional calculator or spreadsheet program.

What is claimed is:

1. A method for entering alpha-numeric data from a data entry device, comprising the steps of
providing a data entry device having eight actuation points arranged in an array,
entering alpha-numeric data by entering sequential actuation points on the keys of the array, wherein the sequential keystrokes define pictographs, the pictographs having endpoints defined by the sequential keystrokes, each pictograph corresponding to a respective character of an alpha-numeric data set.

2. The method of claim 1 wherein the pictographs have a midpoint defined by a center point of the array.

3. The method of claim 1 wherein the array of eight actuation points comprise a first key, a second key, a third key, a fourth key, a fifth key, a sixth key, a seventh key, and an eighth key, the array defining a square in which the first, second and third keys define a first side of the square, the third, fifth, and eighth keys define a second side of the square, the sixth, seventh, and eighth keys defining a third side of the square, and the first, fourth, and sixth keys defining a fourth side of the square.

4. The method of claim 1, wherein each pictograph is defined by a pair of keystrokes.

5. The method of claim 1 wherein each pictograph which corresponds to a letter in the alphanumeric data set is defined by a first stroke passing from an actuation point to be actuated, to the center of the keypad, and a second stroke leading from said center to the second actuation point to be actuated.

6. The method of claim 1, wherein the data entry device is a telephone keypad, and the eight actuation points comprise keys 1,2, 3, 4,6, 7,8, and 9 on the telephone keypad.

7. The method of claim 1, wherein said eight actuation points are arranged radially around the center point so as to correspond to compass points of North, Northeast, East, Southeast, South, Southwest, West and Northwest.

8. The method of claim 1, wherein the data entry device is a joystick.

9. The method of claim 1, wherein the providing step further includes providing a ninth actuation point.

10. The method of claim 9, wherein the ninth actuation point is at a centerpoint of the array.

11. The method of claim 9, further comprising the step of activating a position control function when the ninth actuation point is actuated, the array of eight actuation points controlling movement of a position indicating member when the position control function is activated.

12. The method of claim 1, wherein one or more of the pictographs resemble the letters of the alphabet to which they correspond.

13. The method of claim 3, wherein the alphanumeric data set includes the following characters: "q w e r t y u i o p a s d f g h j k l z x c v b n m,. Q W E R T Y U I O P A S D F G H J K L Z X C V B N M".

14. The method of claim 13, wherein the alphanumeric data set further includes the following characters: "1 2 3 4 5 6 7 8 9 0,./<>?';":][}{\|=+-_)(*&^%$#@!~'".

15. A data entry device, comprising an array of eight actuation points, the data entry device defining an alphanumeric data set as a function of a sequential actuation of the actuation points, the data set including a plurality of characters, each character being defined by a sequential activation of no more than two actuation points, wherein said actuation points defining each character forming a corresponding pictograph, each pictograph having endpoints defined by the actuation point.

16. The method of claim 15 wherein each pictograph has a midpoint defined by a center point of the array.

17. The device of claim 15 wherein the array of eight actuation points comprise a first key, a second key, a third key, a fourth key, a fifth key, a sixth key, a seventh key, and an eighth key, the array defining a square in which the first, second and third keys define a first side of the square, the third, fifth, and eighth keys define a second side of the square, the sixth, seventh, and eighth keys defining a third side of the square, and the first, fourth, and sixth keys defining the fourth side of the square.

18. The device of claim 15 wherein each pictograph which corresponds to a letter in the alphanumeric data set is defined by a first stroke passing from a actuation point to be actuated, to the center of the keypad, and a second stroke leading from said center to the second actuation point to be actuated.

19. The device of claim 15, wherein the data entry device is a telephone keypad, and the eight actuation points comprise keys 1,2, 3, 4,6, 7,8, and 9 on the telephone keypad.

20. The device of claim 15, wherein said eight actuation points are arranged radially around the center point so as to correspond to compass points of North, Northeast, East, Southeast, South, Southwest, West and Northwest.

21. The device of claim 15, wherein the data entry device is a joystick.

22. The device of claim 17, further including a ninth actuation point at the center point of the array.

23. The device of claim 22, wherein the ninth actuation point, when actuated, causes the array of eight actuation points to control movement of a position indicating member.

24. The device of claim 23, wherein the position indicating member is a cursor.

25. The device of claim 15, wherein one or more of the pictographs resemble the letters of the alphabet to which they correspond.

26. The device of claim 15, wherein the alphanumeric data set includes the following characters:"q w e r t y u i o p a s d f g h j k l z x c v b n m,. Q W E R T Y U I O P A S D F G H J K L Z X C V B N M".

27. The device of claim 15, wherein the alphanumeric data set further includes the following characters: "1 2 3 4 5 6 7 8 9 0,./<>?';":][}{\|=+-_)(*&^%$#@!~'".

28. A handheld device for entering and processing data, comprising a housing having eight input keys disposed thereon in a key array, a processor coupled to the key array, the processor monitoring the input keys of the key array and translating keystrokes applied to the input keys into characters of an alphanumeric data set, the characters of the alphanumeric data set being defined as a function of a sequential actuation of the input keys, the data set including a plurality of characters, each character being defined by a sequential activation of no more than two input keys, wherein said actuation points defining each character form a corresponding pictograph, each pictograph having endpoints defined by the actuation point.

29. The handheld device of claim 28, further comprising an infrared I/O port for transmitting signals to a remote device, the processor processing the translated keystrokes into instructions for controlling the remote device.

30. The handheld device of claim 29, wherein the remote device is a television based Internet browser.

31. The handheld device of claim 29, wherein the remote device is a computer.

32. The handheld device of claim 29, wherein the handheld device is a VCR.

33. The handheld device of claim 28, wherein the array of input keys comprise a first key, a second key, a third key, a fourth key, a fifth key, a sixth key, a seventh key, and an eighth key, the array defining a square in which the first, second and third keys define a first side of the square, the third, fifth, and eighth keys define a second side of the square, the sixth, seventh, and eighth keys defining a third side of the square, and the first, fourth, and sixth keys defining the fourth side of the square.

34. The handheld device of claim 28, wherein the alphanumeric data set includes the following characters: "q w e r t y u i o p a s d f g h j k l z x c v b n m,. Q W E R T Y U I O P A S D F G H J K L Z X C V B N M".

35. The handheld device of claim 28, wherein the alphanumeric data set further includes the following characters: "1 2 3 4 5 6 7 8 9 0,./<>?';":][}{\|=+-_)(*&^%$#@!~'".

* * * * *